United States Patent Office 3,254,119
Patented May 31, 1966

3,254,119
TRIARYLPHOSPHINIMINE SULFAMIDES
Rolf Appel, Heidelberg, and Alfred Hauss, Ludwigshafen-Edigheim, Germany, assignors to Olin Mathieson Chemical Corporation, a corporation of Virginia
No Drawing. Filed Aug. 28, 1962, Ser. No. 220,060
4 Claims. (Cl. 260—556)

This invention relates to novel triarylphosphinimine sulfamides and to a process for preparing them.

In this specification and in the claims the term "aryl" is intended to include substituted and unsubstituted aryl groups, the substituents being resistant to the action of acid halides. Suitable substituent groups include halo groups, for example fluoro, chloro, bromo and iodo groups as well as nitro, lower alkoxy and lower alkyl groups containing one to five carbon atoms. The method of the invention is applicable to the synthesis of the following specific compounds:

Triphenylphosphinimine sulfamide
Tri(p-anisyl) phosphinimine sulfamide
Tri(o-tolyl) phosphinimine sulfamide
Tri(p-ethylphenyl) phosphinimine sulfamide
Tri(p-chlorophenyl) phosphinimine sulfamide
Tri(p-bromophenyl) phosphinimine sulfamide
Tri(p-trifluoromethylphenyl) phosphinimine sulfamide
Tri(2-phenanthryl) phosphinimine sulfamide
Tri(m-nitro phenyl) phosphinimine sulfamide
Tri(p-tert.-butylphenyl) phosphinimine sulfamide The novel process of this invention comprises reacting a triarylphosphinimine with sulfamyl chloride. The triarylphosphinimines are obtainable by the process described by Appel and Hauss, Ber. 93, 405 (1960), for the triphenylphosphinimine. Sulfamyl chloride is obtainable by the process of Appel and Berger, Ber. 91, 1341 (1958). Spontaneous reaction of sulfamyl chloride with triarylphosphinimines occurs on mixing in the absence or presence of inert solvents with the formation of the triarylphosphinimine sulfamides according to the following equation:

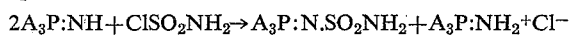

in which A represents an aryl group. The much less soluble triarylphosphiniminium chloride is separated from the more soluble sulfamide product and the latter is then recovered.

The reaction may be carried out without solvent but preferably in the presence of an inert solvent. Hydrocarbon solvents, and particularly benzene are preferred but other useful hydrocarbon solvents include toluene, mesitylene and petroleum ether. Ethers are useful solvents. Diethyl ether, methyl isobutyl ether, anisole and di-n-butyl ether are suitable ethers which are liquid at room temperature. Dimethyl ether can also be used at lower temperatures or elevated pressures. The proportion of reactants to solvent is not critical and can vary from about 1 percent to 50 percent or somewhat more of solute. Temperatures are suitably from about 0° to 50° C. or somewhat higher.

The stoichiometric ratio of triarylphosphinimine to sulfamyl chloride of 2:1 is preferred although somewhat more or less may be used, for example, from about 1.9:1 to 2.1:1.

The sulfamides of this invention have utility themselves without further modification or when diluted with suitable diluents for use as lubricating oil additives, textile assistants, plasticizers, antioxidant for rubber and corrosion inhibitors. For example, 0.1 percent of triphenylphosphinimine sulfamide dissolved in dilute hydrochloric acid reduces its rate of attack on steel.

*Example I*

To a solution of 5.6 g. (20 millimoles) of triphenylphosphinimine in 150 ml. of benzene was added slowly a solution of 1.2 g. (10 millimoles) of sulfamyl chloride in 50 ml. of benzene. Triphenylphosphiniminium chloride precipitated and was separated. The triphenylphosphinimine sulfamide in the filtrate was recovered by distilling off the benzene. It was crystallized from ethanol, adding just sufficient water to the first separation of solid from the hot solvent. The colorless needles melted at 198° C.

Yield 2.1 g. or 59 percent of theory.

Analysis for $C_{18}H_{17}N_2PO_2S$—Calc.: C, 60.65; H, 4.80; N, 7.86; P, 8.69; S, 8.99. Found: C, 59.96; H, 4.93; N, 7.69; P, 8.58; S, 8.85.

*Example II*

In the manner of Example I, tri(o-chlorophenyl) phosphine reacts with sulfamyl chloride to form tri(o-chlorophenyl) phosphinimine sulfamide.

*Example III*

In the manner of Example I, tri(p-tolyl) phosphine reacts with sulfamyl chloride to form tri(p-tolyl) phosphinimine sulfamide.

*Example IV*

Slow addition of a solution of 1.2 g. (10 millimoles) of sulfamyl chloride in 50 ml. of ether to a solution of 7.2 g. (20 millimoles) of tri(p-ethylphenyl) phosphinimine in 150 ml. of ether results in the immediate precipitation of tri(p-ethylphenyl) phosphiniminium chloride. After filtering off the precipitate the ether is distilled off to obtain the residual (p-ethylphenyl) phosphinimine sulfamide.

What is claimed is:

1. As a composition of matter, triarylphosphinimine sulfamides having the formula $A_3P:N.SO_2NH_2$ in which A is resistant to the action of acid halides and is selected from the group consisting of phenyl and substituted phenyl.

2. As a composition of matter, triarylphosphinimine sulfamides having the formula $A_3P:N.SO_2NH_2$ in which A is resistant to the action of acid halides and is selected from the group consisting of phenyl and phenyl substituted by halo, nitro, lower alkoxy and lower alkyl of 1 to 5 carbons.

3. Process for preparing triarylphosphinimine sulfamides having the formula $A_3P:N.SO_2NH_2$ in which A is aryl resistant to the action of acid halides and is selected from the group consisting of phenyl and substituted phenyl which comprises reacting by mixing triarylphosphinimine having the formula $A_3P:NH$ with sulfamyl chloride to form a reaction mixture containing said triarylphosphinimine sulfamide and separating said sulfamide from said reaction mixture.

4. Process for preparing triarylphosphinimine sulfamides having the formula $A_3P:N.SO_2NH_2$ in which A is selected from the group consisting of phenyl and phenyl substituted by halo, nitro, lower alkoxy and lower alkyl of 1 to 5 carbons which comprises reacting by mixing triarylphosphinimine having the formula $A_3P:NH$ with sulfamyl chloride to form a reaction mixture containing said triarylphosphinimine sulfamide and separating said sulfamide from said reaction mixture.

References Cited by the Examiner

UNITED STATES PATENTS 3,023,194  2/1962  Kowalski _____ 260—551

OTHER REFERENCES

Appel et al., Z. Anorg. U. Allgem. Chem., vol. 311, pages 290–301 (September 1961).

Vandi et al., Chem. & Ind., vol. 5, pp. 221–222 (February 1962).

WALTER A. MODANCE, *Primary Examiner.*

IRVING MARCUS, JOHN D. RANDOLPH, *Examiners.*

EGON E. BERG, *Assistant Examiner.*